United States Patent
Shin

(10) Patent No.: US 8,571,848 B2
(45) Date of Patent: Oct. 29, 2013

(54) SYSTEM AND METHOD OF NETWORK EMLATION FOR TEST OF ON-LINE SERVER PROCESSING HEAVY TRAFFIC

(75) Inventor: Kwang Sik Shin, Incheon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 436 days.

(21) Appl. No.: 12/916,905

(22) Filed: Nov. 1, 2010

(65) Prior Publication Data

US 2011/0106518 A1 May 5, 2011

(30) Foreign Application Priority Data

Nov. 3, 2009 (KR) .................. 10-2009-0105561

(51) Int. Cl.
*G06F 9/455* (2006.01)
(52) U.S. Cl.
USPC ............................................ 703/24; 709/223
(58) Field of Classification Search
USPC ........ 703/24; 713/2; 710/74; 178/3; 370/235, 370/252; 709/223
See application file for complete search history.

(56) References Cited

U.S. PATENT DOCUMENTS

| | | |
|---|---|---|
| RE31,182 E * | 3/1983 | Crager et al. ............... 178/3 |
| 7,433,814 B2 | 10/2008 | Liu et al. |
| 7,634,601 B1 * | 12/2009 | Budd et al. .................. 710/74 |
| 2006/0010316 A1 * | 1/2006 | Burokas et al. ................. 713/2 |
| 2009/0097406 A1 * | 4/2009 | Nilakantan et al. ........... 370/235 |
| 2009/0282139 A1 * | 11/2009 | Mejdrich et al. .............. 709/223 |
| 2010/0076744 A1 * | 3/2010 | Gehr et al. .................... 703/24 |
| 2011/0075577 A1 * | 3/2011 | Chen et al. .................... 370/252 |

FOREIGN PATENT DOCUMENTS

KR  10-2006-0064451 A  6/2006

OTHER PUBLICATIONS

Avvenuti, M., et al.,"Application-level network emulation: the EmuSocket toolkit", Journal of Network and Computer Applications, vol. 29, Issue 4 pp. 343-360, 2006.
Zheng, Pei, and Ni, Lionel, "EMPOWER: A Cluster Architecture Supporting Network Emulation", IEEE Transactions on Parallel and Distributed Systems, vol. 15, No. 6, pp. 1-13, Jun. 2004.

* cited by examiner

*Primary Examiner* — Kandasamy Thangavelu
(74) *Attorney, Agent, or Firm* — Kile Park Reed & Houtteman PLLC

(57) ABSTRACT

In a network emulation system of the present invention, a packet transmitted from a user-mode application program is intercepted at a kernel-mode network driver and transferred to a user-mode emulation module to perform emulation, and, thereafter, the corresponding packet is returned to the network driver. The emulation module emulates a network characteristic of a multi-node environment through configuration of virtual network topology. At this time, the emulation module classifies the intercepted packets for each flow, stores the classified packets in a plurality of real queues, stores a virtual packet corresponding to the real packet in a virtual queue, and transfers the virtual packet to a virtual network including a plurality of virtual nodes to emulate the network.

18 Claims, 3 Drawing Sheets

SYSTEM AND METHOD OF NETWORK EMLATION FOR TEST OF ON-LINE SERVER PROCESSING HEAVY TRAFFIC

CROSS-REFERENCE TO RELATED APPLICATIONS

This application claims priority under 35 U.S.C. §119 to Korean Patent Application No. 10-2009-0105561, filed on Nov. 3, 2009, in the Korean Intellectual Property Office, the disclosure of which is incorporated herein by reference in its entirety.

TECHNICAL FIELD

The present invention relates to a system and a method of network emulation, and more particularly, a system and a method of network emulation for a test of an on-line server processing heavy traffic.

BACKGROUND

A known network emulation technology is generally classified into a single-node emulation technology adopting end-to-end network characteristics in a single node and a multi-node emulation technology naturally adopting network characteristics while a packet moves by configured network topology.

The single-node emulation technology is generally implemented as a software module operating in the same host as transmission program and performs emulation before a transmission packet goes out to a network. Since the single-node emulation technology operates in a host, an emulation technology can be easily applied and emulation data can be easily extended through the increase in the number of hosts. On the contrary, since the end-to-end characteristics of the network are applied as an operation result value, reproduction of a queuing delay, a queuing loss, jitter, etc., generated in a queue of a real network node is somewhat vulnerable, and emulation with respect to variations of a protocol environment such as a routing protocol is impossible. The single-node emulation technology is classified into a user mode scheme depending on an application program and a kernel mode scheme operating at a network driver independently from the application program. The user mode scheme is easily implemented, while the user mode scheme has a disadvantage of changing an emulator to suit the changed target application program whenever a target application program is changed or creating the target application program to suit the emulator. Since the packet is intercepted and the emulation is applied at the network driver, the kernel mode scheme can be used as it is even though the application program is changed, but it is difficult to apply a complicated algorithm to the kernel mode scheme.

Meanwhile, the multi-node emulation technology is implemented as an independent emulation device, which is generally connected with a transmission/reception node through a network port, other than operating as a software module operating at the host. Virtual network topology is generated in a system and the network characteristics are applied while the packet moves in accordance with a routing algorithm. A packet transmitted from a transmission node is emulated while it moves through a virtual network and thereafter, it is transferred to a final reception node. Since the virtual network topology is generated and the packet moves through each node, the real network characteristics (queuing loss, queuing delay, jitter, etc.), which were difficult to reproduce in a single-node emulator, are applied. However, since construction of such a system costs a lot and the system is designed for a general network environment test, an additional system should be constructed in order to emulate a large number of packets. As a result, an extension of the system is limitative.

SUMMARY

According to an aspect of the present invention, there is provided a network emulation system that comprises: a network driver interface specification (NDIS) hook driver intercepting a packet transferred from an application program; and an emulation module, disposed in a user mode, performing network emulation of the intercepted packet and transferring the emulated packet to the NDIS hook driver.

Herein, the emulation module may include: an emulation core emulating network characteristics of a multi-node environment through configuration of a virtual network topology; and a filter determining whether the intercepted packet is to be emulated, transmitting the packet to the emulation core when the packet is determined to be emulated, and returning the packet to the NDIS hook driver when the packet is determined not to be emulated.

Or, the emulation module may include: a flow classifier classifying the packet for each flow; a plurality of real queues each storing the packet classified for each flow; a virtual queue storing a virtual packet corresponding to the packet; a virtual network including a plurality of virtual nodes transferring the virtual packet; and a packet dispatcher transferring the packet to the NDIS hook driver corresponding to the virtual packet that arrived at a destination node on the virtual network. At this time, the flow classifier determines whether the intercepted packet is to be emulated and returns the intercepted packet to the NDIS hook driver when the intercepted packet is not to be emulated.

It is preferable that the real queue is implemented by a circular queue and the virtual queue is implemented as a double buffer structure. The virtual packet has a storage address reference value for the packet instead of packet data.

Each of the virtual nodes may have a routing table. The virtual network uses a real-time routing method to read the virtual packet from the virtual queue, move the virtual packet to a start node specified in the virtual packet, and transfer the virtual packet to a subsequent virtual node in accordance with an address of the destination node specified in the virtual packet on the basis of a value of the routing table in each virtual node. The packet referencing the virtual packet lost in the virtual network is not transferred but removed.

According to another aspect of the present invention, there is provided a network emulation method that comprises: intercepting, by a kernel-mode NDIS hook driver, a packet transferred from a user-mode application program; emulating the intercepted packet in a user-mode virtual network; and returning the emulated packet to the NDIS hook driver; routing the virtual packet to a subsequent virtual node in accordance with an address of the destination node specified in the virtual packet on the basis of a value of the routing table in each virtual node.

Herein, the emulating may include: classifying the packets for each flow and storing the classified packets in a plurality of real queues, respectively; generating a virtual packet corresponding to the packet and storing the generated virtual packet in a virtual queue; and emulating the virtual packet in a virtual network including a plurality of virtual nodes. The storing the packets in the real queues may include returning the packet to the NDIS hook driver when it is determined that the intercepted packet is not requiring emulation as a result of classifying the packet for each flow.

According to an exemplary embodiment of the present invention, network characteristics including a queuing delay, a queuing loss, jitter, etc. really generated in a queue can be emulated even though the emulator is operated at a host. It is because the emulator of the present invention utilizes a multi-node emulation technology using virtual network topology.

Further, dynamic routing, which is really operated in a network, can be applied, and thus a realistic network environment can be reproduced.

In addition, since traffic required for a test can be sufficiently increased by increasing the number of hosts, the present invention is suitable for a test of on-line server processing heavy traffic.

Other features and aspects will be apparent from the following detailed description, the drawings, and the claims.

DETAILED DESCRIPTION OF EMBODIMENTS

Figure 1:
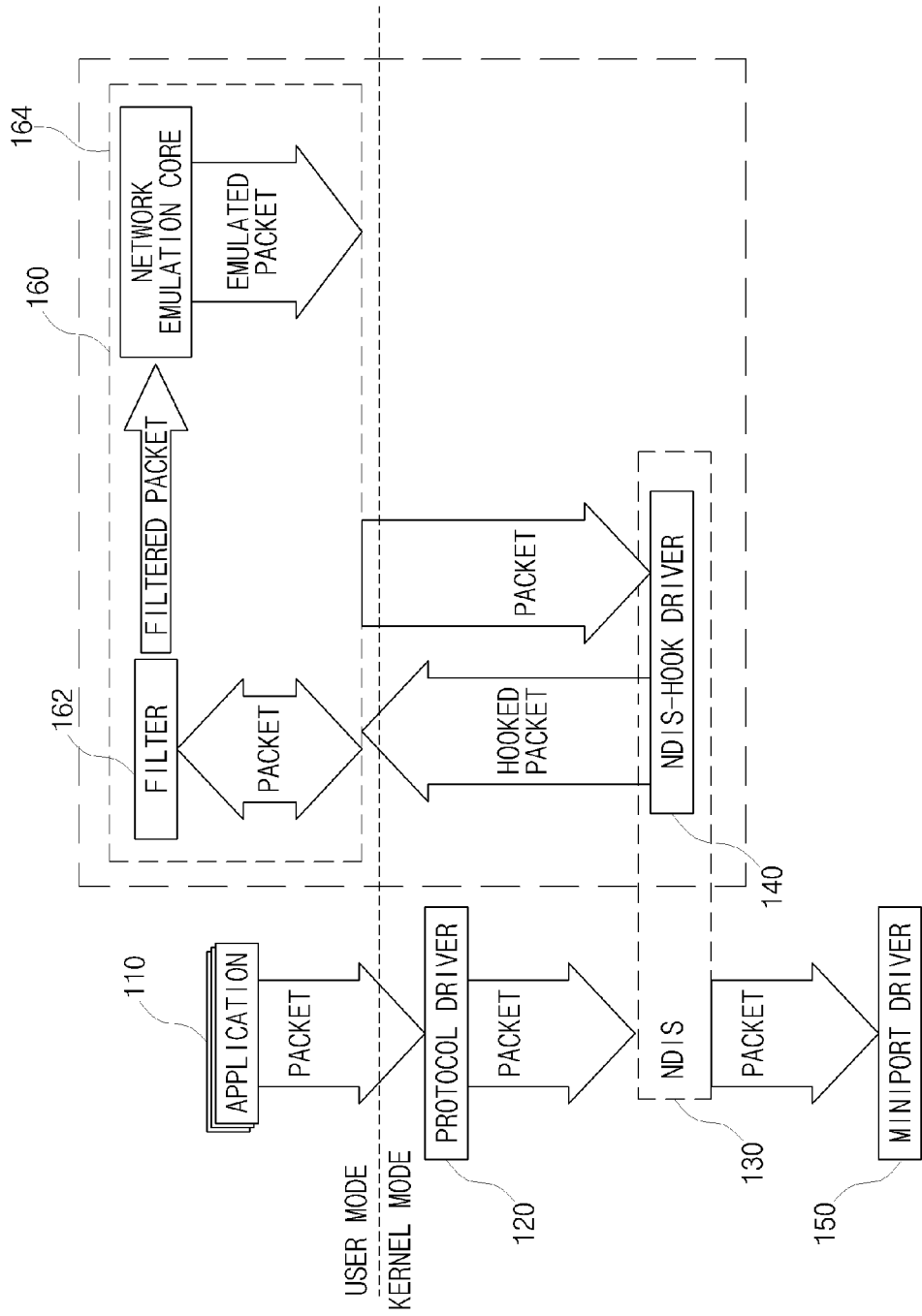
FIG. 1 is a diagram showing a schematic configuration of a network emulation system and the flow of a packet according to an exemplary embodiment of the present invention.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, preferred embodiments of the present invention will be described with reference to the accompanying drawings. FIG. 1 is a diagram showing a schematic configuration of a network emulation system and the flow of a packet according to an exemplary embodiment of the present invention. The network emulation system shown in FIG. 1 includes a user-mode application program 110, a kernel-mode protocol driver 120, a kernel-mode NDIS hook driver 140 of a kernel-mode NDIS 130, a kernel-mode miniport driver 150, and a user-mode emulation module 160.

As shown in FIG. 1, in the network emulation system according to the embodiment of the present invention, a packet transmitted from the user-mode application program 110 is intercepted by the NDIS-hook driver 140 of the kernel-mode network driver interface specification (NDIS) 130. The intercepted packet is transferred to the user-mode emulation module 160 to be emulated and thereafter, is again returned to the NDIS-hook driver 140 so as to transmit the packet to the outside.

The emulation module 160 includes an emulation core 164 and a filter 162. The filter 162 serves to filter a packet to be emulated. That is, it is determined whether the packet intercepted by the NDIS-hook driver 140 is a packet that should be emulated, and, when it is determined that the intercepted packet is to be emulated, the intercepted packet is transmitted to the emulation core 164. Otherwise, the intercepted packet is returned to the NDIS-hook driver 140 so as to be directly transmitted to the outside.

According to the exemplary embodiment of the present invention, in order to reproduce an effect as if a real packet moves through a real network, after the packet is transferred through virtual network topology, the real packet is transmitted to a server in accordance with a delay, a loss, etc. of a virtual packet. Herein, the reason why the virtual packet referencing the real packet is sent instead of transmitting the real packet to a virtual network is that a system load caused due to data copy between nodes that is generated while the real packet is transferred is reduced. The packet in the virtual network is transferred based on addresses of a start node and a destination node recorded in the virtual packet and a route is determined depending on a value, which is stored in a routing table of a virtual node, for the destination node. The virtual node configuring the virtual network has a routing table which is dynamically variable in order to apply various routing algorithms, the maximum instant transmission rate and the average transmission rate of a link are controlled by an algorithm based on a token bucket model, and a propagation delay attribute of the link is reproduced by regularly setting a packet movement time between nodes.

According to the exemplary embodiment of the present invention, in order to emulate heavy traffic, the emulator 160 operates as a software module of a host to emulate a packet generated by a host and, thereafter, transfer the emulated packet to the server. A known emulator that operates at the host performs only an end-to-end emulation function, but the present invention is a multi-node emulation technology configuring the virtual network topology in the emulator.

In order to facilitate application of a complicated algorithm while performing emulation independently from an application program, the packet transmitted from the application program is intercepted by the kernel-mode NDIS hook driver and transferred to the user-mode emulation module to perform emulation and, thereafter, the packet is transferred to the NDIS hook driver to be transmitted to the outside, in the present invention as shown in FIG. 1.

While the known single-node emulator reproduces the delay, loss, reordering, etc., of the packets by adjusting a transmission time of each packet depending on an application result of a predetermined algorithm, it is possible to reproduce a propagation delay, a queuing delay, a queuing loss, jitter, etc., that are generated while the packet moves depending on the routing table of each node by generating a plurality of nodes by configuring the virtual network topology, according to the embodiment of the present invention.

Figure 2:
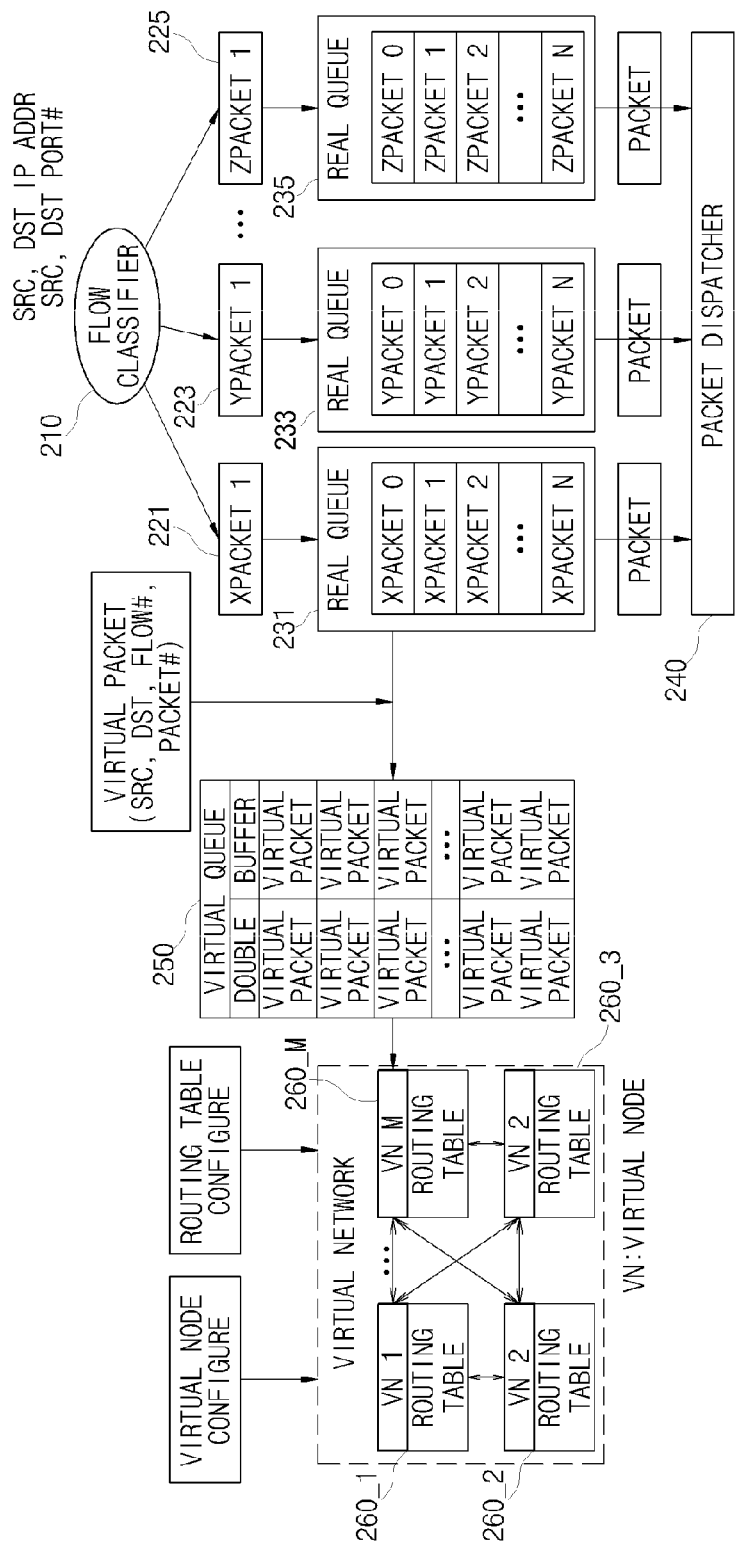
FIG. 2 is a configuration diagram of an emulation core of a network emulation system according to an exemplary embodiment of the present invention.

Hereinafter, a configuration of the emulation core 164 of the network emulation system according to the embodiment of the present invention will be described in detail. FIG. 2 is a configuration diagram illustrating an emulation core according to an exemplary embodiment of the present invention.

As shown in FIG. 2, the emulation core includes a flow classifier 210, a plurality of real queues 231, 233, and 235, a virtual queue 250, a virtual network 260, and a packet dispatcher 240.

The flow classifier 210 classifies packets 221, 223, and 225 that are transferred from the application program and intercepted by the NDIS hook driver in accordance with a flow, and stores the packets in the corresponding real queues 231, 233, and 235, respectively. Since a delay time applied in emulation is different depending on the flow, the queue is allocated depending on the flow in order to efficiently use the queue. The flow classifier 210 may also serve as the filter 162 shown in FIG. 1. That is, the flow classifier 210 stores the packets classified for each flow in the corresponding real queue 231, 233, and 235 and packets not requiring emulation are not stored in the real queues but returned to the NDIS-hook driver 140 to be transmitted to the outside.

The flow classifier 210 also generates virtual packets using a reference value for each of the real packets stored in the real queues 231, 233, and 235 and stores the generated virtual packets in the virtual queue 250.

The virtual packet stored in the virtual queue 250 is transferred to the virtual network 260. The virtual network 260 is constituted by a plurality of virtual nodes 260_1, 260_2, 260_3, ..., 260_M. Each of the virtual nodes 260_1, 260_2, 260_3, ..., 260_M has its own routing table.

The packet dispatcher 240 dispatches the real packet corresponding to the virtual packet, of which emulation is terminated on the virtual network 260, to the outside.

Emulation may be performed by two threads. The first thread, which is performed by the flow classifier 210, classifies the packets 221, 223, and 225 intercepted by the NDIS hook driver for each flow, stores the packets in the corresponding real queues 231, 233, and 235, respectively, and generates the virtual packet using the reference value for the real packet and stores the generated virtual packet in the virtual queue 250. The second thread reads the packet from the virtual queue 250 and, thereafter, transfers the packet depending on link attributes and the routing tables of the virtual nodes 260_1, 260_2, 260_3, ..., 260_M constituting the virtual network 260.

In FIG. 2, the flow classifier 210 classifies the flows in accordance with a rule specified by the user by checking a transmission IP, a transmission port number, a reception IP, and a reception port number, of which the real packets 221, 223, and 225 are transmitted, from IP headers of the packets 221, 223, and 225.

The flows are stored in the real queues 231, 233, and 235. The virtual packet (having only a value of an address where the real packet is stored instead of packet data) for the real packet is generated. Then, source (src) and destination (dst) node addresses (addresses of a virtual node to which the packet is first transferred and a virtual node which the packet is last transferred before the packet is transmitted to the outside, in the virtual network) to be used in the virtual network, flow ID, and a sequence number of the packet (unique identification number is allocated to each packet for monitoring and analyzing the emulation network) are allocated to the generated virtual packet. The virtual packet is then stored in the virtual queue 250.

The real queues 231, 233, and 235 are allocated with storage spaces for each flow to have a circular queue structure not requiring a retrieval process for rapid processing. In this case, since the real packet should stay in the queue until emulation is terminated, the packet that should stay in the queue for a long time due to a long delay prevents storage space from being wasted in the real queue.

The virtual queue 250 stores the virtual packet without distinction of the flow and is constituted by double buffers not requiring an additional memory access limit for synchronization so as for two threads to access the virtual queue at the same time.

The virtual network 260 configures the network topology in accordance with a network environment (a bandwidth of each node, a queue size, a propagation delay of the link, etc.) specified by the user and the routing algorithm (preparation of the routing table of each node) and, thereafter, reads the packet from the virtual queue 250 and transfers the packet between the virtual nodes, such that the real packet referenced by the virtual packet that reaches the dst node is transmitted to the outside by the packet dispatcher 240.

Meanwhile, the real packet referencing the virtual packet lost in the virtual network 260 is not transmitted but removed.

A delay and a loss generated while the virtual packet passes through the virtual network are applied to the real packet as it is.

A virtual node designated as the destination node (dst node) in the virtual network is previously determined at the time of applying the emulation for the on-line server test and each virtual node records in the routing table only routing information on the virtual node designated as the destination node during the test without the need to record information on all nodes in the virtual network so as to more efficiently manage the routing information.

Figure 3:
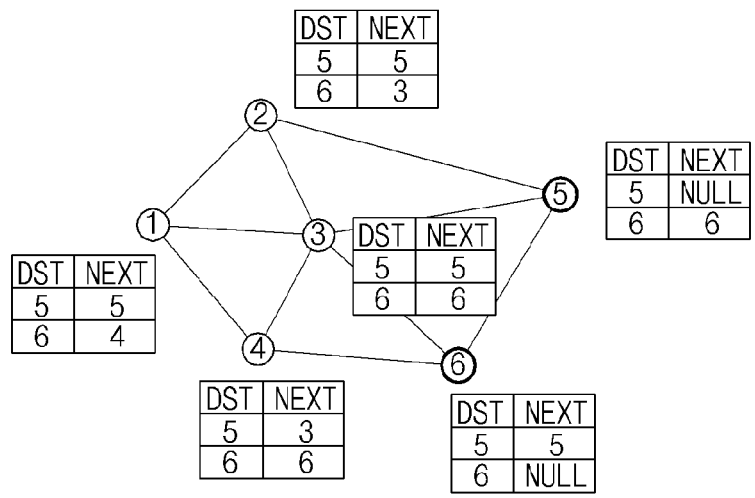
FIG. 3 is a diagram showing an example of a routing table of a virtual node in a virtual network used in a network emulation system according to an exemplary embodiment of the present invention.

FIG. 3 is a diagram showing an example of a routing table of a virtual node in a virtual network used in a network emulation system according to an exemplary embodiment of the present invention. FIG. 3 shows an example of the routing table of each virtual node when only nodes 5 and 6 are used as the destination node.

In FIG. 3, when Next is NULL in the routing table of nodes 5 and 6, the real packet is transferred to the outside. In the present invention, since the dynamic routing algorithm is applicable by the routing table for each virtual node, a network characteristic such as "out of order" can be emulated by dynamic route alternation.

The link attribute between the nodes is defined by adjusting the packet movement speed in each virtual node in the virtual network. The link attribute is generally defined by the propagation delay and the bandwidth. The propagation delay is set as the packet movement speed between the virtual nodes, and the bandwidth is set by implementing the token bucket model based algorithm to fix the average transmission rate and the maximum transmission rate with bucket size and token generation rate designated for each node.

Meanwhile, it is possible to monitor an operation state of the emulation network by recording information on the corresponding packet, a time, loss information, etc. whenever the packet reaches and is transmitted to each virtual node.

The present invention is the network emulation technology operating at the host, but since the present invention performs emulation by intercepting the packet at the NDIS hook driver, the present invention operates independently from the application program and configures the virtual network topology to similarly reproduce the network characteristic generated while queuing as if the real packet goes through the router on the network.

Since the flows in the virtual network are classified and emulated depending on the transmission/reception IP address and port number in the single host, a network environment in which various flows move can be emulated. Since the emulated packet is transmitted to the network, the traffic scale can be easily extended by increasing the number of hosts mounted with the emulation technology in order to transmit the heavy traffic on the network.

Figure 4:
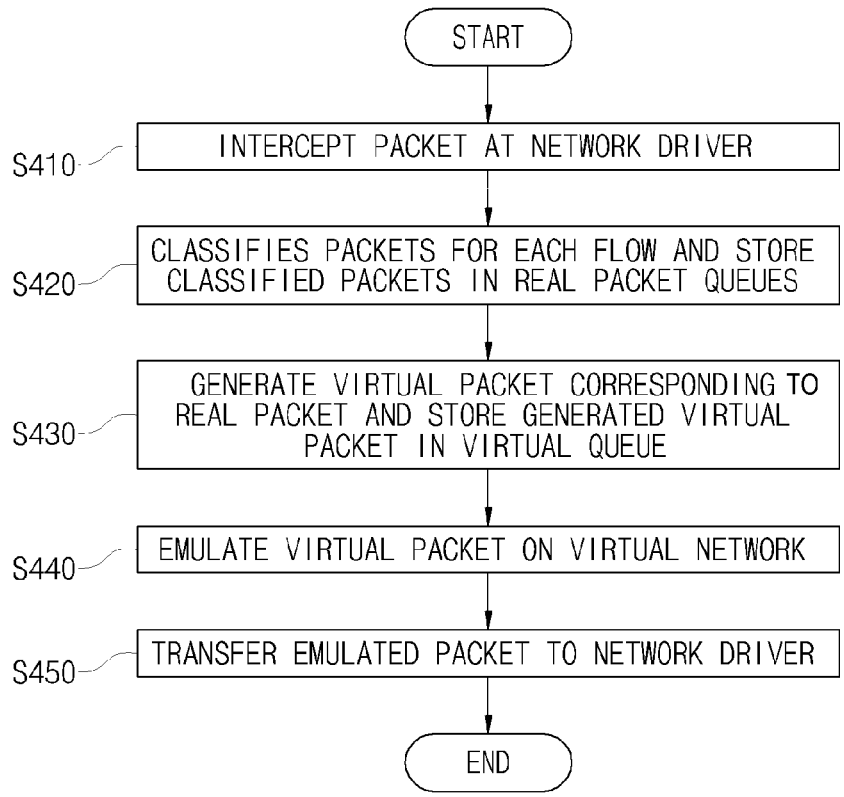
FIG. 4 is a flowchart showing a network emulation method according to an exemplary embodiment of the present invention.

Hereinafter, a network emulation method according to an embodiment of the present invention will be described. FIG. 4 is a flowchart showing a network emulation method according to an exemplary embodiment of the present invention.

As shown in FIGS. 1 and 4, when a packet is transferred towards a kernel-mode network driver (e.g., a protocol driver, an NDIS hook driver, a miniport driver, etc.) from a user-mode application program, the transferred packet is intercepted by an NDIS hook driver (S410).

Next, the intercepted packet is classified for each flow and stored in a real queue provided for each flow (S420).

A virtual packet referencing an address value storing the packet for each real packet is generated and stored in a virtual queue (S430).

The virtual packet stored in the virtual queue is emulated using a virtual network constituted by a plurality of virtual nodes (S440).

When the emulation is completed, the real packet corresponding to the relevant virtual packet is returned to the NDIS hook driver to be transmitted to the outside (S450).

The network emulation method according to the exemplary embodiment of the present invention can be implemented as a computer-readable code in a computer-readable recording medium. The computer-readable recording media includes all types of recording apparatuses in which data readable by a computer system is stored. Examples of the computer-readable recording media include a ROM, a RAM, a CD-ROM, a magnetic tape, a hard disk, a floppy disk, a flash memory, an optical data storage, etc., and in addition, include a recording medium implemented in the form of a carrier wave (for example, transmission through the Internet). Further, the computer-readable recording media are distributed on computer systems connected through a computer communication network, and thus the computer-readable recording media may be stored and executed as the computer-readable code by a distribution scheme.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A network emulation apparatus, comprising:
    a hardware processor; and
    a non-transitory computer-readable medium, wherein the non-transitory computer-readable medium comprises computer-readable code executable by the hardware processor, and wherein the computer-readable code comprises:
        a network driver interface specification (NDIS) hook driver, disposed in a kernel mode, configured to intercept packets transferred from a user-mode application program; and
        an emulation module, disposed in the user mode, configured to receive the packets from the NDIS hook driver, perform network emulation of a first packet in the packets, and transfer the first packet to the NDIS hook driver after the network emulation of the first packet is performed,
    wherein the emulation module comprises:
        a flow classifier configured to classify the first packet based on its flow;
        a plurality of real queues each corresponding to a respective flow, wherein the first packet is stored in at least one of the real queues based on its flow;
        a virtual queue configured to store a generated virtual packet corresponding to the first packet;
        a virtual network comprising a plurality of virtual nodes configured to transfer the virtual packet; and
        a packet dispatcher configured to transfer the first packet to the NDIS hook driver when the virtual packet corresponding to the first packet arrives at a destination node in the virtual network.

2. The network emulation apparatus according to claim 1, wherein the emulation module comprises:
    an emulation core configured to emulate network characteristics of a multi-node environment through configuration of a virtual network topology, and wherein the emulation core comprises the flow classifier, the plurality of real queues, the virtual queue, the virtual network, and the packet dispatcher; and
    a filter configured to determine whether the packets are to be emulated, transmit the first packet to the emulation core when the first packet is determined to be emulated, and return a second packet in the abets to the NDIS hook driver when the second packet is determined not to be emulated.

3. The network emulation apparatus according to claim 1, wherein the flow classifier is configured to determine whether the packets are to be emulated and return a second packet in the packets to the NDIS hook driver when the second packet is not to be emulated.

4. The network emulation apparatus according to claim 1, wherein each of the real queues is implemented by a circular queue.

5. The network emulation apparatus according to claim wherein the virtual packet has a storage address reference value for the first packet.

6. The network emulation apparatus according to claim 1, wherein the virtual queue is implemented as a double buffer structure.

7. The network emulation apparatus according to claim 1, wherein each of the virtual nodes has a routing table.

8. The network emulation apparatus according to claim 7, wherein the virtual network is configured to use a real-time routing method to read the virtual packet from the virtual queue, move the virtual packet to a start node specified in the virtual packet, and transfer the virtual packet to a subsequent virtual node in accordance with an address of the destination node specified in the virtual packet on the basis of a value of the routing table of each virtual node.

9. The network emulation apparatus according to claim 1, wherein the packet dispatcher is configured to not transfer a third packet in the packets to the NDIS hook driver, but remove the third packet from the real queue(s) in which the third packet is stored, when a virtual packet corresponding to the third packet is lost in the virtual network.

10. A computer program product comprising a non-transitory computer-readable medium, wherein the non-transitory computer-readable medium comprises computer-readable code that, when executed by a computer, causes the computer to perform:
    intercepting, by a kernel-mode NDIS hook driver, packets transferred from a user-mode application program;
    receiving, by a user-mode emulation module, the packets from the NDIS hook driver;

emulating, by the emulation module, a first packet in the packets in a user-mode virtual network; and returning, by the emulation module, the first packet to the NDIS hook driver after the emulating the first packet, wherein the emulation module comprises a flow classifier, a plurality of real queues each corresponding to a respective flow, a virtual queue, the virtual network comprising a plurality of virtual nodes, and a packet dispatcher, wherein the emulating comprises:

classifying, by the flow classifier, the first packet based on its flow;

storing the first packet in at least one of the real queues based on its flow;

generating a virtual packet corresponding to the first packet, and storing the virtual packet in the virtual queue; and transferring the virtual packet among the virtual nodes in the virtual network, and wherein the returning comprises transferring, by the packet dispatcher, the first packet to the NDIS hook driver when the virtual packet corresponding to the first packet arrives at a destination node in the virtual network.

11. The computer program product according to claim 10, where the emulating comprises:

determining whether the packets are to be emulated;

emulating the first packet in the user-mode virtual network when it is determined that the first packet is to be emulated; and returning a second packet in the packets to the NDIS hook driver when it is determined that the second packet is not to be emulated.

12. The computer program product according to claim 10, wherein the classifying comprises returning a second packet in the packets to the NDIS hook driver when it is determined that the second packet is not requiring emulation.

13. The computer program product according to claim 10, wherein each of the real queues is implemented by a circular queue.

14. The computer program product according to claim 10, wherein the virtual packet has a storage address reference value for the first packet.

15. The computer program product according to claim 10, wherein the virtual queue is implemented as a double buffer structure.

16. The computer program product according to claim 10, wherein each of the virtual nodes has a routing table.

17. The computer program product according to claim 16, wherein the virtual network uses a real-time routing method to read the virtual packet from the virtual queue, move the virtual packet to a start node specified in the virtual packet, and transfer the virtual packet to a subsequent virtual node in accordance with an address of the destination node specified in the virtual packet on the basis of a value of the routing table of each virtual node.

18. The computer program product according to claim 10, wherein the returning comprises:

removing a third packet in the packets from the real queue(s) in which the third packet is stored when a virtual packet corresponding to the third packet is lost in the virtual network.

\* \* \* \* \*